United States Patent
Hansen et al.

(10) Patent No.: US 9,949,227 B2
(45) Date of Patent: Apr. 17, 2018

(54) LOCATION DETERMINATION

(71) Applicant: Apple Inc., Cupertino, CA (US)

(72) Inventors: Christopher J. Hansen, Los Altos, CA (US); Stuart K. Neubarth, Mountain View, CA (US)

(73) Assignee: APPLE INC., Cupertino, CA (US)

(*) Notice: Subject to any disclaimer, the term of this patent is extended or adjusted under 35 U.S.C. 154(b) by 265 days.

(21) Appl. No.: 14/214,209

(22) Filed: Mar. 14, 2014

(65) Prior Publication Data

US 2014/0269391 A1   Sep. 18, 2014

Related U.S. Application Data

(60) Provisional application No. 61/785,591, filed on Mar. 14, 2013.

(51) Int. Cl.
| | |
|---|---|
| *H04W 64/00* | (2009.01) |
| *G01S 5/02* | (2010.01) |
| *G01S 5/14* | (2006.01) |
| *G01S 13/74* | (2006.01) |

(52) U.S. Cl.
CPC ......... *H04W 64/003* (2013.01); *G01S 5/0205* (2013.01); *G01S 5/0236* (2013.01); *G01S 5/14* (2013.01); *G01S 13/74* (2013.01)

(58) Field of Classification Search
CPC ................ H04W 64/003; H04W 4/021–4/023
See application file for complete search history.

(56) References Cited

U.S. PATENT DOCUMENTS

| | | | | |
|---|---|---|---|---|
| 2010/0008337 A1* | 1/2010 | Bajko | ................... | H04W 64/00 370/338 |
| 2010/0309051 A1* | 12/2010 | Moshfeghi | ............ | G01S 5/0236 342/378 |
| 2012/0264447 A1* | 10/2012 | Rieger, III | ............ | G01S 5/0252 455/456.1 |
| 2012/0314587 A1* | 12/2012 | Curticapean | .......... | G01S 5/0257 370/252 |
| 2014/0105172 A1* | 4/2014 | Daum | ................... | H04W 48/16 370/330 |
| 2014/0112250 A1* | 4/2014 | Bahrenburg | ......... | H04B 1/7083 370/328 |
| 2016/0029155 A1* | 1/2016 | Kerr | ........................ | H04W 4/02 455/456.3 |

\* cited by examiner

*Primary Examiner* — Anh-Vu Ly
*Assistant Examiner* — Hector Reyes Ortiz
(74) *Attorney, Agent, or Firm* — Downey Brand LLP

(57) ABSTRACT

A method and apparatus for location determination by a WLAN station is disclosed. The method can include a first WLAN station receiving a packet sent by a second WLAN station, deriving a channel quality metric for a channel between the first WLAN station and the second WLAN station, comparing the channel quality metric to a threshold, and calculating a distance between the first WLAN station and the second WLAN station in an instance in which the channel quality metric satisfies the threshold.

18 Claims, 8 Drawing Sheets

LOCATION DETERMINATION

CROSS-REFERENCE TO RELATED APPLICATIONS

This application claims the benefit of U.S. Patent Application No. 61/785,591 entitled "Location Determination" filed on Mar. 14, 2013, which is incorporated herein by reference in its entirety for all purposes.

FIELD

The described embodiments generally relate to wireless communications technology, and more particularly to location determination by a wireless local area network (WLAN) station.

BACKGROUND

Wireless communication devices are often used within large facilities, such as airports, office complexes, stadiums, and the like, which can have a WLAN that includes a plurality of WLAN stations. A user of such a wireless communication device can wish to know his or her location within a facility, such as for purposes of indoor navigation. Techniques have been developed for a wireless communication device, operating as a WLAN station, to determine its location based on signaling that can occur with another WLAN station.

While these techniques have been developed to enable a wireless communication device to determine its location, location accuracy is fundamentally limited by the ability of a WLAN station to determine its distance from another WLAN station. In indoor conditions, the accuracy of a distance calculation can be severely affected by reflected signal paths resulting from a line of sight signal reflecting off of objects. As such, WLAN stations can often derive inaccurate location estimates based on inaccurate distance estimates and can expend overhead in terms of computation time and battery power calculating several distance estimates due to inaccuracies. User experience often suffers due to inaccurate location estimates and reduced battery life from performing several calculations.

SUMMARY

This paper describes various embodiments that relate to location determination by a WLAN station.

In one embodiment, a method for determining a location of a WLAN station is disclosed. The method includes the WLAN station receiving a packet from a second WLAN station over a channel. The WLAN station derives a channel quality metric associated with the channel based on the received packet. In one aspect of the embodiment, the derivation includes using the received packet to estimate the channel by calculating a channel impulse response. Next, the channel quality metric is compared to a threshold. Upon determining that the channel quality metric satisfies the threshold, the WLAN station can calculate a distance between the WLAN station and the second WLAN station.

In one embodiment, the WLAN station includes a wireless interface, a processor, and a storage apparatus. The storage apparatus is configured to store instructions that, when executed by the processor, cause the WLAN station to perform a number of actions. The WLAN station receives location information from an access point. The location information is associated with at least one neighboring access point of the access point. The WLAN station uses the location information to select a neighboring access point. The WLAN station uses the selected neighboring access point to determine a location of the WLAN station. The WLAN station calculates a distance between the WLAN station and the selected neighboring access point. In some embodiments, the WLAN station calculates the distance by monitoring a timing measurement exchange between the selected neighboring access point and another access point.

In another embodiment, a non-transitory computer readable storage medium is disclosed. The non-transitory computer readable storage medium is configured to store instructions that, when executed by a processor included in an access point, cause the access point to perform a number of actions. The access point receives location information from a neighboring access point. The location information is associated with the neighboring access point. In one aspect of the embodiment, the location information is received wirelessly and in another aspect of the embodiment the location information is received via a wired connection. Next, the access point stores the location information at the access point. The access point broadcasts a public action frame to one or more WLAN stations. At least one of the WLAN stations the access point broadcasts to is not associated with the access point. The public action frame includes at least a portion of the location information.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

DETAILED DESCRIPTION

Figure 1:
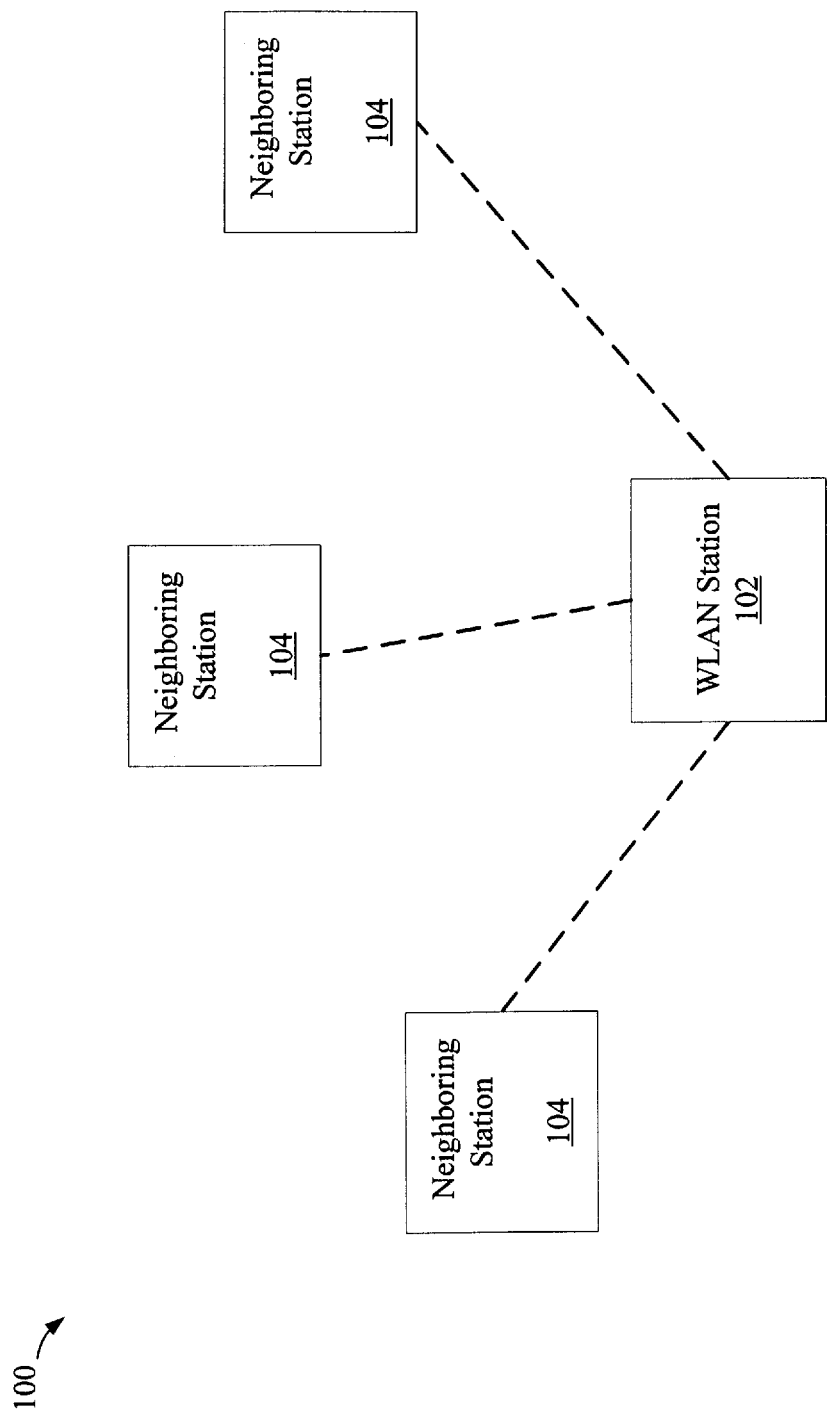
FIG. 1 illustrates a wireless communication system in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Location accuracy is fundamentally limited by the ability of a WLAN station to determine its distance from known location, such as a distance from an access point or other WLAN station with known coordinates, and/or a distance from a previous location. Present techniques for determining a location can rely on distance estimates without regard to channel quality. In many situations, and particularly when indoors, a distance that can be calculated by a WLAN station can be inaccurate due to noise energy from echoes, or reflected signal paths, that can overwhelm the energy of the line of sight signal path. In this regard, a signal emitted by a WLAN station in an indoor environment can be reflected off of walls or other objects before it arrives at another WLAN station. As such, distance estimates can suffer due to the reflected signal path, leading to inaccurate location estimates. Some devices can attempt to compensate for potential inaccurate range estimates by calculating a location based on distance estimates to several WLAN stations. However, calculation of distance estimates can be both time intensive and power intensive, and may not result in an improved location estimate, thus wasting processor cycles and consuming battery power, which can lead to a negative user experience, particularly when a resulting location estimate is inaccurate.

Some embodiments provide for improved accuracy in location determination by a WLAN station that can address such problems. More particularly, a WLAN station in accordance with some embodiments can be configured to derive a channel quality metric for a channel between the WLAN station and a second WLAN station. The channel quality metric of some such embodiments can be derived based on a channel impulse response that can be calculated based on a packet received from the second WLAN station. If the channel quality metric fails to satisfy a threshold, then the WLAN station of such embodiments can (i) elect to not calculate a distance estimate to the second WLAN station and/or (ii) derive another channel quality metric with the second WLAN station at another time. If, however, the channel quality metric satisfies the threshold, then the WLAN station can calculate a distance estimate to the second WLAN station. The threshold can be tuned based at least in part on a desired accuracy. As such, any distance estimates calculated for use in location determination can satisfy a threshold accuracy level, providing for improved accuracy in location determination, as distance estimates on channels suffering from severe multipath echoes can be avoided through application of the threshold. Further, since distance estimates calculated in accordance with such embodiments can be assumed to satisfy a threshold level of accuracy, the number of calculated distance estimates can be reduced in many instances, thus reducing time and power needed by a device to determine its location.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates a wireless communication system 100 in accordance with some embodiments. The wireless communication system 100 can include a WLAN station 102. By way of non-limiting example, the WLAN station 102 can be embodied as a mobile wireless communication device, such as a smart phone device, a tablet computing device, a laptop computing device, and/or other computing device that can be configured to communicate over one or more wireless networks. In some embodiments, the WLAN station 102 can be configured to operate as a WLAN station on a WLAN (e.g., an ad hoc WLAN and/or a structured WLAN), such as can use an Institute of Electrical and Electronics Engineers (IEEE) 802.11 technology, such as 802.11a, 802.11b, 802.11g, 802.11n, 802.11ac, 802.11ad, wireless communication protocol and/or the like. However, it will be appreciated that embodiments described using WLAN and/or 802.11 techniques are provided by way of example, and not by way of limitation. In this regard, embodiments described herein can be applied to wireless networks using other technologies and protocols in which a wireless communication device can obtain network access from an access point.

The wireless communication system 100 may further include one or more neighboring stations 104. Three such neighboring stations 104 are illustrated by way of example in FIG. 1. However, it can be appreciated that the wireless communication system 100 can include additional or fewer neighboring stations 104 in accordance with various embodiments. Each neighboring station 104 can be within sufficient proximity of the WLAN station 102 to allow for signaling to occur between the WLAN station 102 and the neighboring station 104 in accordance with a WLAN technology that can be used by the WLAN station 102 and neighboring stations 104. The neighboring stations 104 can each respectively be embodied as any type of WLAN station, including a client station or an access point. In some embodiments, the WLAN station 102 and/or one or more neighboring stations 104 can be located indoors.

As will be described further herein below, the WLAN station 102 can be configured to calculate its location relative to the location(s) of one or more neighboring stations 104. In this regard, the WLAN station 102 can calculate a distance to each of one or more neighboring stations 104 and use the calculated distance(s) to determine its own location. In some embodiments described further below, the WLAN station 102 can determine a channel quality metric for a channel between the WLAN station 102 and a respective neighboring station 104 before calculating a distance to the neighboring station 104. If the channel quality metric fails to satisfy a threshold, then the WLAN station 102 can omit calculating a distance to that neighboring station 104. Accordingly, the accuracy of a calculated distance estimate can be improved by ensuring that the channel quality metric for a channel to a neighboring station 104 satisfies a threshold before calculating a distance estimate. Further, as such embodiments can provide distance estimates satisfying a threshold accuracy, a number of distances that can be calculated for use in location determination can be reduced.

Figure 2:
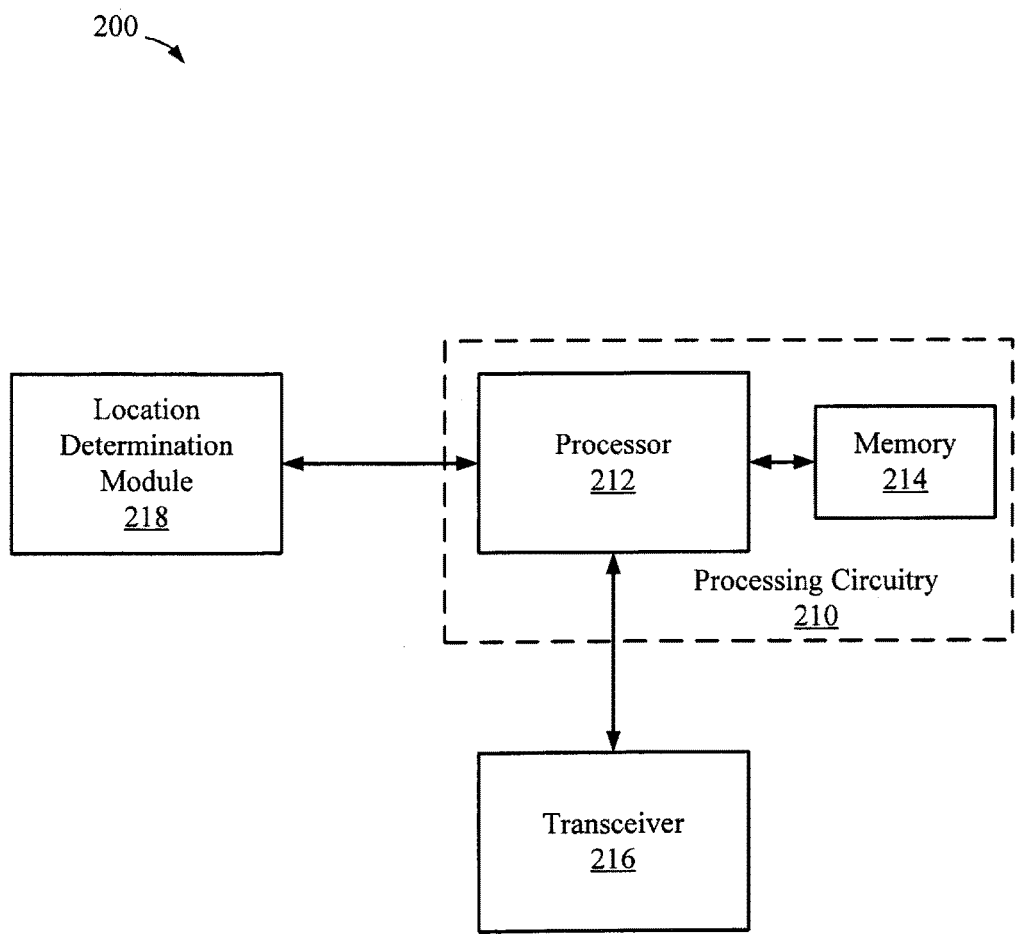
FIG. 2 illustrates a block diagram of an apparatus that can be implemented in a wireless communication device operating as a WLAN station in accordance with some embodiments.

FIG. 2 illustrates a block diagram of an apparatus 200 that can be implemented in a WLAN station 102 in accordance with some embodiments. In this regard, when included in a computing device, such as WLAN station 102, apparatus 200 can enable the computing device to operate within the wireless communication system 100 in accordance with one or more embodiments. It will be appreciated that the components, devices or elements illustrated in and described with respect to FIG. 2 may not be mandatory and thus some may be omitted in certain embodiments. Additionally, some embodiments can include further or different components, devices or elements beyond those illustrated in and described with respect to FIG. 2.

In some embodiments, the apparatus 200 can include processing circuitry 210 that can be configured to perform actions in accordance with one or more embodiments disclosed herein. In this regard, the processing circuitry 210 can be configured to perform and/or control performance of one or more functionalities of the apparatus 200 in accordance with various embodiments, and thus can provide means for performing functionalities of the apparatus 200 in accordance with various embodiments. The processing circuitry 210 can be configured to perform data processing, application execution and/or other processing and management services according to one or more embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset comprising one or more chips. In some embodiments in which one or more components of the apparatus 200 are embodied as a chipset, the chipset can be capable of enabling a computing device to operate in the wireless communication system 100 when implemented on or otherwise operably coupled to the computing device. Thus, for example, one or more components of the apparatus 200 can provide a chipset configured to enable a computing device to communicate using one or more wireless network technologies.

In some embodiments, the processing circuitry 210 can include a processor 212 and, in some embodiments, such as that illustrated in FIG. 2, can further include memory 214. The processing circuitry 210 can be in communication with or otherwise control a transceiver 216 and/or a location determination module 218.

The processor 212 can be embodied in a variety of forms. For example, the processor 212 can be embodied as various processing hardware-based means such as a microprocessor, a coprocessor, a controller or various other computing or processing devices including integrated circuits such as, for example, an application specific integrated circuit (ASIC), a field programmable gate array (FPGA), some combination thereof, or the like. Although illustrated as a single processor, it can be appreciated that the processor 212 can include a plurality of processors. The plurality of processors can be in operative communication with each other and can be collectively configured to perform one or more functionalities of the apparatus 200 as described herein. In some embodiments, the processor 212 can be configured to execute instructions that can be stored in the memory 214 or that can be otherwise accessible to the processor 212. As such, whether configured by hardware or by a combination of hardware and software, the processor 212 can be capable of performing operations according to various embodiments while configured accordingly.

In some embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more embodiments. In some embodiments, the memory 214 can be in communication with one or more of the processor 212, the transceiver 216, or the location determination module 218 via a bus(es) for passing information among components of the apparatus 200.

The apparatus 200 can further include the transceiver 216. The transceiver 216 can be configured to enable the apparatus 200 to send and receive wireless signals in accordance with one or wireless local area networking technologies, such as, one or more versions of IEEE 802.11 wireless communication protocol. As such, the transceiver 216 can enable the apparatus 200 to send signals to and receive signals from a neighboring station 104.

The apparatus 200 can further include the location determination module 218. The location determination module 218 can be embodied as various means, such as circuitry, hardware, a computer program product comprising computer readable program instructions stored on a computer readable medium, e.g., the memory 214, and executed by a processing device, e.g., the processor 212, or some combination thereof. In some embodiments, the processor 212 (or the processing circuitry 210) can include, or otherwise control the location determination module 218.

The location determination module 218 of some embodiments can be configured to selectively calculate a distance to a respective neighboring station 104 based at least in part on a channel quality metric for a channel between the WLAN station 102 and the neighboring station 104. In this regard, the location determination module 218 of some such embodiments can be configured to derive a channel quality metric for a channel between the WLAN station 102 and a neighboring station 104 based at least in part on a packet sent by the neighboring station 104. If the derived channel quality metric satisfies a threshold, the location determination module 218 can choose to calculate a distance to the neighboring station 104. If, however, the channel quality metric does not satisfy the threshold, the location determination module 218 can decide to not calculate a distance to the neighboring station, as any distance calculated to the neighboring station may not satisfy a threshold accuracy.

A channel quality metric that can be derived by the location determination module 218 can be a channel estimate that can be indicative of a distance error in a time of flight measurement on the channel. In this regard, distance error in time of flight measurements can be a function of a channel impulse characteristic and signal to noise ratio (SNR). The channel impulse response can be defined as:

$$h(n) \text{ for } n=0 \ldots k-1 \qquad [1],$$

where $h(0)$ corresponds to the line of sight, or shortest path, which can represent the actual distance; and terms $h(1) \ldots h(k-1)$ correspond to reflected paths.

If the ratio of energy in the first tap (e.g., for the line of sight path) to the sum of energy of all taps is sufficiently large, then an accurate distance estimate on the channel is possible. As such, the location determination module 218 can be configured to derive a channel estimate representing a channel quality metric and compare the channel estimate to a threshold as shown below in equation [2].

$$SNR\left(\frac{h^2(0)}{\sum_{n=0}^{k-1} h^2(n)}\right) > \text{threshold} \qquad [2]$$

If the channel estimate exceeds the threshold, then the location determination module 218 can determine that a distance estimate having at least a desired accuracy can be calculated, and can calculate a distance to the neighbor station that sent the packet. In some embodiments, the location determination module 218 can be configured to simplify the computation of equation [2] by calculating H(k) in the frequency domain when deriving a channel estimate, as follows:

$$SNR \frac{\left(\sum_{n=0}^{k-1} H(n)\right)^2}{\sum_{n=0}^{k-1} H^2(n)} > \text{threshold} \qquad [3]$$

The threshold used in equations [2] and [3] can be set to ensure a desired level of accuracy for a distance calculation. The location determination module 218 of some embodiments can accordingly apply a threshold test using channel estimates, such as in accordance with equation [2] and/or [3], for a frame exchange with a neighbor station, such as a frame exchange for determining round trip time (RTT). If the threshold is satisfied (e.g., exceeded) by the channel estimate, the location determination module 218 can be configured to determine that a distance measurement calculation will have at least a desired level of accuracy and can calculate the distance.

If, however, the threshold is not satisfied (e.g., not exceeded) by a channel estimate derived based on a packet received from a neighbor station, the location determination module 218 can decide not to calculate a distance to the neighbor station based on the received packet and can conduct additional measurement(s). The additional measurement(s) can be conducted with another neighbor station(s), which can yield a more accurate distance measurement (e.g., a neighbor station for which a channel estimate can satisfy the threshold).

In some embodiments, a desired level of accuracy for a distance calculation can be based on the spatial scale of a location that is associated the wireless communication system 100. For example, the location can be a large facility like an airport or a university campus. Accordingly, the desired level of accuracy can be on the scale of a hundred feet. In another example, the location can be a grocery store or a library. A user can use a WLAN station 102 for location determination to determine how far they are from a particular item or particular aisle. Accordingly, the desired level of accuracy can be on the scale of a few feet. In this regard, a threshold used for smaller locations can be greater than a threshold used for larger locations.

In some embodiments, multiple distance measurements can be taken into account for use in location determination by the location determination module 218. In such embodiments, a weighting factor can be derived and applied to each distance measurement. The respective weighting factors that can be applied to the considered distance measurements can be determined based at least in part on the threshold test. For example, the weighting factor that can be applied to a distance measurement can be scaled in accordance with the corresponding channel quality metric; such that a distance estimate calculated based on a channel having a higher channel quality metric can be accorded a higher weight. In some embodiments, weighted least squares and/or other weighting technique can be used for weighting distance estimates used for location determination.

Figure 3:
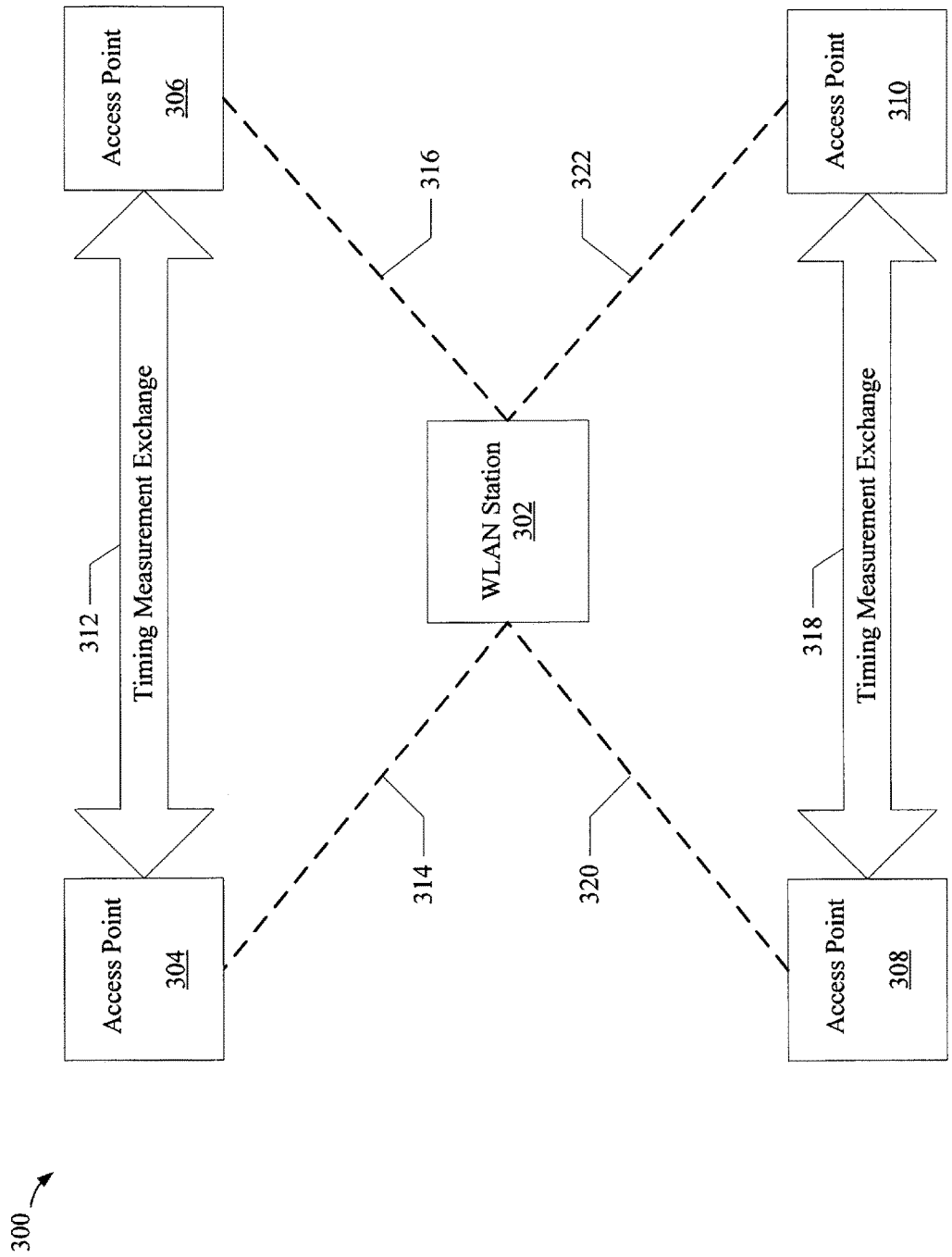
FIG. 3 illustrates a wireless communication system in accordance with some embodiments.

FIG. 3 illustrates an example application of some embodiments in which multiple distance estimates can be considered within the context of a wireless communication system. In the example of FIG. 3, a WLAN station 302 can be within communication range of a plurality of access points, including the access point 304, the access point 306, the access point 308, and the access point 310. The WLAN station 302 can be an embodiment of the WLAN station 102. As such, the apparatus 200 can be implemented on the WLAN station 302 in accordance with some embodiments. The access points 304-310 can be embodiments of respective neighboring stations 104.

In some embodiments, the WLAN station 302 can be configured to passively observe timing measurement exchanges between the access points to determine its location. The WLAN station 302 can, for example, observe a timing measurement exchange 312 between the access point 304 and the access point 306. The WLAN station 302 can use the timing measurement exchange 312 to calculate a distance 314 to access point 304 and/or a distance 316 to access point 306. The WLAN station 302 can calculate channel quality metrics for the channel to the access point 304 and the channel to the access point 306 based on packets received from the timing measurement exchange 312, and can determine based on the channel quality metrics that the distance estimate to access point 304 satisfies a threshold accuracy level, but the distance estimate to access point 306 does not satisfy the threshold accuracy level.

The WLAN station 302 can decide to stay awake to listen to the timing measurement exchange 318 between the access point 308 and the access point 310 to obtain a better distance estimate(s) for use in location determination. The WLAN station 302 can use the timing measurement exchange 318 to calculate a distance 320 to access point 308 and/or a distance 322 to access point 310. For example, the access point 308 and/or the access point 310 can provide the WLAN station 302 with timing data associated with the timing measurement exchange 318. The timing data can be provided to the WLAN station 302 as the timing measurement exchange 318 occurs or after the timing measurement exchange 318 is completed. The WLAN station 302 can calculate channel quality metrics for the channel to the access point 308 and the channel to the access point 310 based on timing data received from the timing measurement exchange 318, and can determine whether the distance estimate to the access point 310 is satisfactory based on a channel quality metric.

In some embodiments, the WLAN station 302 can use hyperbolic navigation to determine a location of the WLAN station 302 based on the distance 314 and the distance 316. A hyperbolic navigation operation can include calculating potential locations of the WLAN station 302 with respect to the access point 304 and the access point 306. For example, the access point 304 can be at the center of a first circle having a first radius and the access point 306 can be at the center of a second circle having a second radius. The first circle and the second circle can intersect at a first intersection location and at a second intersection location. Since the WLAN station 302 is positioned at a distance 314 from the access point 304 and positioned at a distance 316 from the access point 306, it can be deduced that the WLAN station 302 is located at either the first intersection location or the second intersection location. Determining the first intersection location and the second intersection location can be performed by the WLAN station 302 by performing functions on the data that the WLAN station 302 received during the timing measurement exchange 312 between the access point 304 and the access point 306. The functions can be based on differential distance equations, geometric equations, and/or the like. Furthermore, in conjunction with other information, e.g., location information as described in more detail herein, the WLAN station 302 can eliminate either the first intersection location or the second intersection location as a location possibility. For example, in the case where the WLAN station 302 is positioned a distance 320 from access point 308, the access point 308 can be at the center of a third circle having a third radius. In this regard, the WLAN station 302 can be located at a location where the first, second, and third circles intersect. In some embodiments, the WLAN station 302 can determine the 320 distance from the access point 308 by causing the access point 308 to initiate a timing measurement exchange 318 with access point 310 and monitor the timing measurement exchange 318.

The WLAN station 302 can select from among the distance estimates for distances 314, 316, 320, and 322 to use for determine of its location, and can determine its location based on weighted consideration of the selected distances. In some embodiments, the WLAN station 302 can even use those distances (e.g., distance 316 and distance 320) that do not have a threshold accuracy level, but can assign those a lower weighting. In some embodiments, if a channel estimate indicates that an accuracy of a distance estimate is below a certain threshold, the distance estimate may be thrown out and not considered for purposes of location determination.

It will be appreciated that any type of received packet can be used for channel estimation by a WLAN station for purposes of derivation of a channel quality metric. In some embodiments, the threshold to which the channel quality metric can be compared can be scaled based at least in part on a bandwidth associated with the packet. For example, a threshold that can be applied to a channel quality metric derived based on a received beacon can be different than a threshold that can be applied to a channel quality metric derived from a higher bandwidth exchange.

In some embodiments, the location determination module 218 can be configured to apply a staged filtering process for distance estimation. For example, a first channel estimate can be determined for a channel with a neighboring station based on a received low bandwidth packet, such as a beacon. If the first channel estimate fails to satisfy a threshold, then further measurement may not be performed based on exchanges with that neighboring station. If, however, the first channel estimate does satisfy the threshold, the location determination module 218 can be configured to provoke a higher bandwidth exchange, which can yield an improved estimate. A packet that can be received attendant to the higher bandwidth exchange can be used for purposes of deriving a second channel estimate and/or an estimated distance calculation.

In some embodiments, the location determination module 218 can be configured to generate a map or other indication of a location of the WLAN station 102, which can be presented to a device user, such as on a display or other element of a user interface that can be implemented on the WLAN station 102. The location indication can be provided with an indication of an estimated accuracy, such as a circle representing a range of uncertainty. The estimated accuracy can be determined based at least in part on the channel quality metrics for the respective distance(s) used to determine the location estimate.

Figure 4:
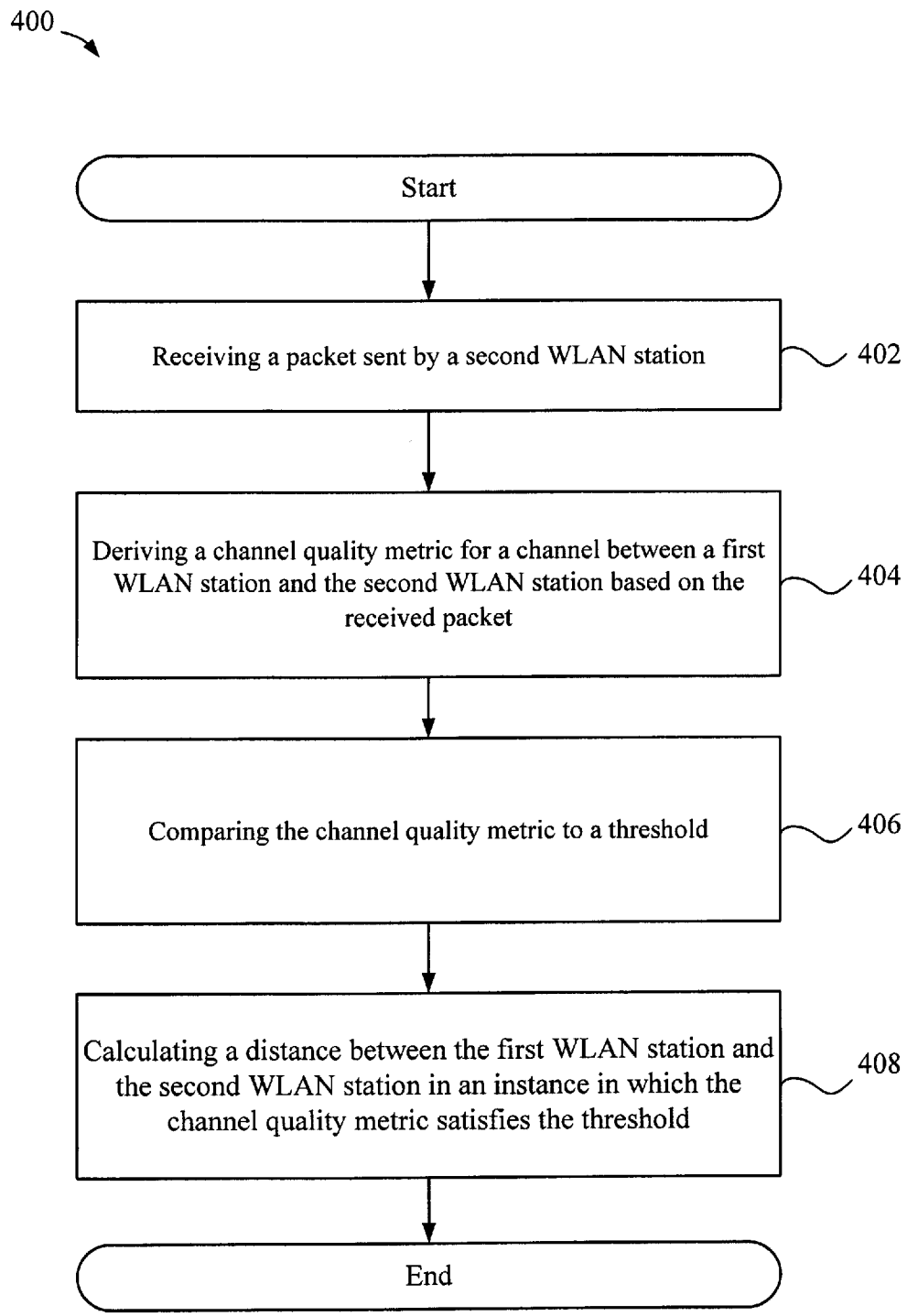
FIG. 4 illustrates a flow chart of a method for determining a location of a WLAN station in accordance with some embodiments.

FIG. 4 illustrates a flow chart 400 of a method for location determination of a WLAN station in accordance with some embodiments. In this regard, FIG. 4 illustrates steps that can be performed by a WLAN station, such as WLAN station 102. One or more of processing circuitry 210, processor 212, memory 214, transceiver 216, or location determination module 218 can, for example, provide means for performing the steps illustrated in and described with respect to FIG. 4.

Step 402 can include the WLAN station 102 receiving a packet sent by another WLAN station, e.g., a neighboring station 104. Step 404 can include the WLAN station 102 deriving a channel quality metric for a channel between the WLAN station 102 and the neighboring station 104 based on the received packet. For example, the WLAN station can use the packet to estimate the channel at least in part by calculating a channel impulse response.

Step 406 can include comparing the channel quality metric to a threshold, such as in accordance with equation [2] or equation [3]. If it is determined in step 406 that the channel quality metric satisfies the threshold, step 408 can include the WLAN station 102 calculating a distance between the WLAN station 102 and the neighboring station 104. Step 408 can be omitted in an instance in which the channel quality metric does not satisfy the threshold.

Some embodiments also facilitate location determination by a WLAN station through a mechanism by which a WLAN station, such as an access point, can share location information for one or more neighboring stations, such as one or more neighboring access points, with another WLAN station. Some embodiments as described further herein below provide access points configured to share such location information with a WLAN station, even if the WLAN station is not associated with the access point. As such, some such embodiments can facilitate improved location determination by a WLAN station by enabling a WLAN station to obtain location information from an access point without the WLAN station having to associate the access point. Such embodiments can accordingly reduce power consumption by the WLAN station and reduce unnecessary over the air signaling, as the WLAN station can avoid having to engage in an association procedure with an access point just for purposes of obtaining location information. Further, some such embodiments can enable a WLAN station to obtain location information from an access point for which it does not have access privileges. In this regard, such embodiments offer significant advantages over present neighbor request/response procedures, which may not be implemented by all access points, can only be utilized by WLAN stations associated with an access point, and which do not provide information in a format suitable for indoor location.

Figure 5:
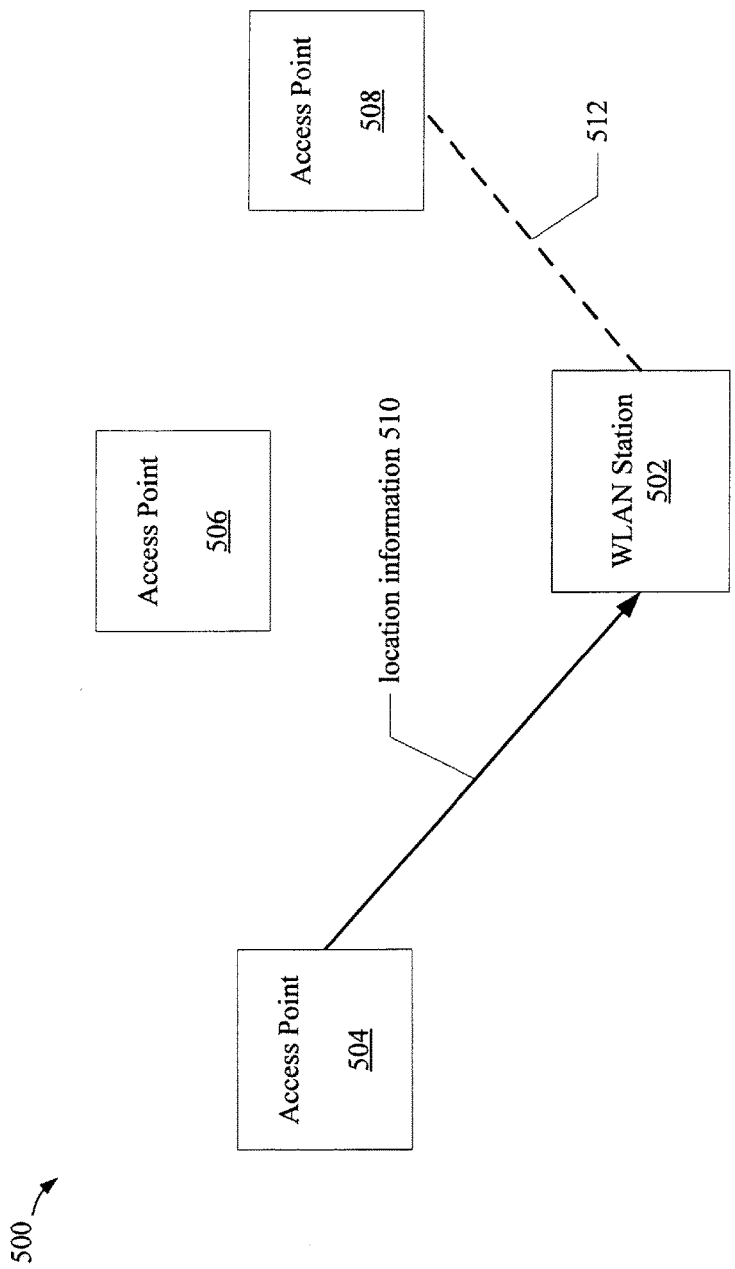
FIG. 5 illustrates a wireless communication system in accordance with some embodiments.

FIG. 5 illustrates an example application of some embodiments within the context of a wireless communication system 500. In this regard, FIG. 5 illustrates a WLAN station 502, which can be within signaling range of one or more access points. By way of example, access point 504, 506, and 508 are illustrated. It will be appreciated, however, that the wireless communication system 500 can include additional or fewer access points in some implementations. The WLAN station 502 can be an embodiment of WLAN station 102. As such, apparatus 200 can be implemented on WLAN station 502 in accordance with some embodiments. One or more access points can provide WLAN station 502 with location information 510. For example, the access point 504 can publically broadcast location information 510. Any WLAN station within signaling range of the access point 504, such as the WLAN station 502, can receive the location information 510.

Figure 6:
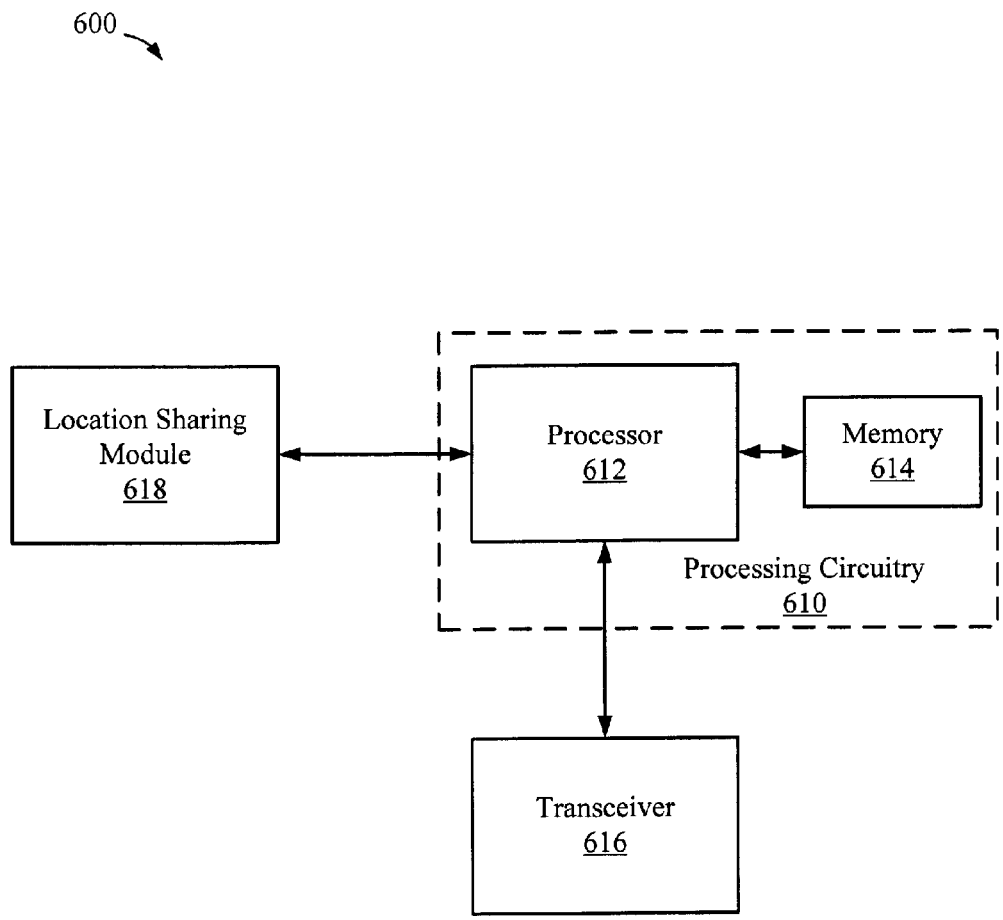
FIG. 6 illustrates a block diagram of an apparatus that can be implemented in an access point in accordance with some embodiments.

FIG. 6 illustrates a block diagram of an apparatus 600 that can be implemented in an access point, such as access point 504, 506, and/or 508, in accordance with some embodiments. In this regard, when implemented or included in an access point, apparatus 600 can enable the access point to operate as an access point within the wireless communication system 500 in accordance with one or more embodiments. It will be appreciated that the components, devices or elements illustrated in and described with respect to FIG. 6 below may not be mandatory and thus some may be omitted in certain embodiments. Additionally, some embodiments can include further or different components, devices or elements beyond those illustrated in and described with respect to FIG. 6.

In some embodiments, the apparatus 600 can include processing circuitry 610 that can be configured to perform actions in accordance with one or more embodiments disclosed herein. In this regard, the processing circuitry 610 can be configured to perform and/or control performance of one or more functionalities of the apparatus 600 in accordance with various embodiments, and thus can provide means for performing functionalities of the apparatus 600 in accordance with various embodiments. The processing circuitry 610 can be configured to perform data processing, application execution and/or other processing and management services according to one or more embodiments.

In some embodiments, the apparatus 600 or a portion(s) or component(s) thereof, such as the processing circuitry 610, can include one or more chipsets, which can each include one or more chips. The processing circuitry 610 and/or one or more further components of the apparatus 600 can therefore, in some instances, be configured to implement an embodiment on a chipset comprising one or more chips. In some embodiments in which one or more components of the apparatus 600 are embodied as a chipset, the chipset can be capable of enabling a computing device to operate as an access point in the wireless communication system 500 when implemented in or otherwise operably coupled to the computing device.

In some embodiments, the processing circuitry 610 can include a processor 612 and, in some embodiments, such as that illustrated in FIG. 6, can further include memory 614. The processing circuitry 610 can be in communication with or otherwise control a transceiver 616 and/or a location sharing module 618.

The processor 612 can be embodied in a variety of forms. For example, the processor 612 can be embodied as various processing hardware-based means such as a microprocessor, a coprocessor, a controller or various other computing or processing devices including integrated circuits such as, for example, an ASIC, an FPGA, some combination thereof, or the like. Although illustrated as a single processor, it will be appreciated that the processor 612 can include a plurality of processors. The plurality of processors can be in operative communication with each other and can be collectively configured to perform one or more functionalities of the apparatus 600 as described herein. In some embodiments, the processor 612 can be configured to execute instructions that can be stored in the memory 614 or that can be otherwise accessible to the processor 612. As such, whether configured by hardware or by a combination of hardware and software, the processor 612 can be capable of performing operations according to various embodiments while configured accordingly.

In some embodiments, the memory 614 can include one or more memory devices. Memory 614 can include fixed and/or removable memory devices. In some embodiments, the memory 614 can include a non-transitory computer-readable storage medium that can store computer program instructions that can be executed by the processor 612. In this regard, the memory 614 can be configured to store information, data, applications, instructions and/or the like for enabling the apparatus 600 to carry out various functions in accordance with one or more embodiments. In some embodiments, the memory 614 can be in communication with one or more of the processor 612, the transceiver 616, or the location sharing module 618 via a bus(es) for passing information among components of the apparatus 600.

The apparatus 600 can further include the transceiver 616. The transceiver 616 can be configured to enable the apparatus 600 to send and receive wireless signals in accordance with one or wireless networking technologies. As such, the transceiver 616 can enable the apparatus 600 to send signals to and receive signals from another access point(s) and WLAN stations, such as the WLAN station 502.

The apparatus 600 can further include the location sharing module 618. The location sharing module 618 can be embodied as various means, such as circuitry, hardware, a computer program product including computer readable program instructions stored on a computer readable medium, e.g., the memory 614, and executed by a processing device, e.g., the processor 612, or some combination thereof. In some embodiments, the processor 612 (or the processing circuitry 610) can include, or otherwise control the location sharing module 618.

The location sharing module 618 can be configured to obtain information, such as location information, from one or more neighboring access points. In some embodiments, location information can be any information associated a neighboring access point. For example, location information can include one or more of: a basic service set identifier (BSSID), an Internet Protocol (IP) address, a media access control (MAC) address, a physical location (e.g., coordinates), a distance between two access points, information that identifies a building and/or room an access point is located, and beacon timing information (e.g., the frequency or time interval at which beacons are broadcasted). Thus, for example, when implemented in access point 504, the location sharing module 618 can obtain location information from the access point 506 and/or the access point 508. The obtained location information can, for example, be obtained via beacons that can be sent by the neighboring access points. Additionally or alternatively, in some embodiments, the access points can be tied together via a wired backbone and can be configured to exchange location information via the wired backbone. The location sharing module 618 can be configured to obtain and store location information in any data structure, such as, by way of non-limiting example, a table, which can be stored in memory 614.

The location sharing module 618 can be configured to share location information with a WLAN station, such as WLAN station 502. For example, access point 504 can share location information 510 that can be associated with the access points 506 or the access point 508 with WLAN station 502. Shared location information can be sent in any frame or other signaling that can be transmitted by an access point. In some embodiments, an access point can share location information with a WLAN station that is not associated with the access point. For example, WLAN station 502 may not be associated with access point 504 in some embodiments. As such, location sharing module 618 can be configured in some embodiments to include and send location information in a beacon, public action frame, and/or other frame that can be broadcast or otherwise sent such that it can be received by an unassociated WLAN station.

In some embodiments, the location sharing module 618 can be configured to send location information, e.g., location information 510, to a WLAN station, e.g., WLAN station 502, in response to a request from the WLAN station. The request can, for example, be a dedicated request for location information. In some embodiments, the request can be defined such that it can be sent to an access point by a WLAN station that is not associated with the access point. In some embodiments in which location information can be shared with a WLAN station in response to a request from the WLAN station, the location information can be provided to the WLAN station in a public action frame.

Returning to the example of FIG. 5, WLAN station 502 can, for example, discover the access point 503 by hearing a beacon that can be sent by the access point 504. In some instances, the WLAN station 502 may not be associated with the access point 504. The WLAN station 502 can then request location information for neighboring access points from the access point 504, and the access point 504 can respond by sending location information 510 to WLAN station 502.

In some embodiments, the WLAN station 502 can learn of the existence of the access point 506 and the access point 508 from the location information 510. Based on the location information, WLAN station 502 can determine that it can best estimate its location by calculating the distance from WLAN station 502 to access point 508 rather than calculating the distance from WLAN station 502 to access point 506. The WLAN station 502 can accordingly estimate the distance 512 to the access point 508 and use the estimated distance for location determination.

In embodiments in which the location information 510 includes beacon timing information for the access point 508, the WLAN station 502 can use the beacon timing information to determine when to wake up to distance the access point 508 (e.g., based on a beacon that can be sent by the access point 508). In this regard, the WLAN station 502 can conserve power by only waking up when beacons will be sent.

Figure 7:
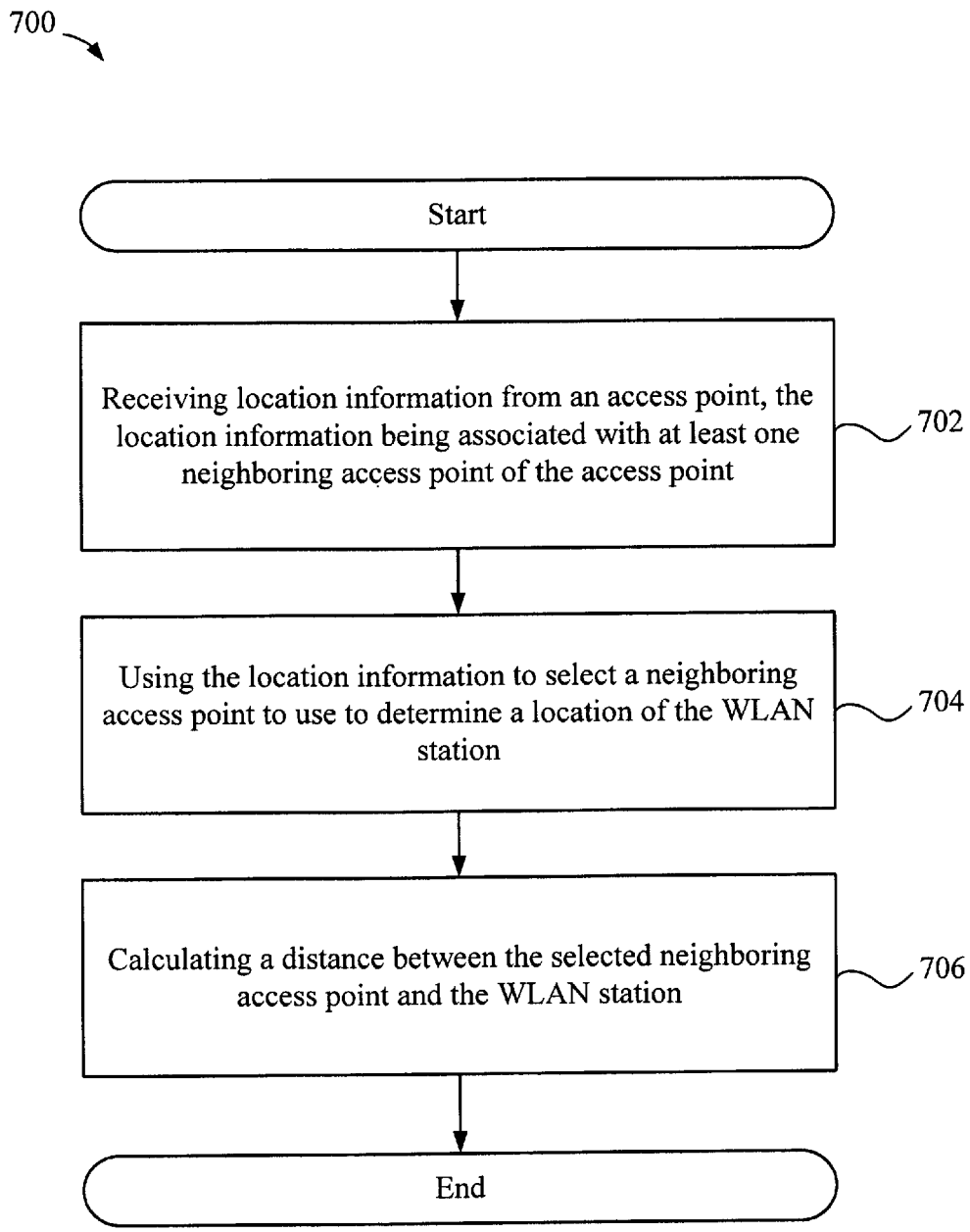
FIG. 7 illustrates a flow chart of a method for determining a location of a WLAN station in accordance with some embodiments.

FIG. 7 illustrates a flow chart 700 of a method for location determination by a WLAN station in accordance with some embodiments. In this regard, FIG. 7 illustrates operations that can be performed by a WLAN station, such as WLAN station 502, in accordance with various embodiments. One or more of processing circuitry 210, processor 212, memory 214, transceiver 216, or location determination module 218 can, for example, provide means for performing the operations illustrated in and described with respect to FIG. 7.

Step 702 can include a WLAN station receiving location information from an access point, such as the access point 504. The location information can be associated with at least one neighboring access point, e.g., the access point 506 and/or the access point 508, of the access point. In some embodiments, the WLAN station may not be associated with the access point from which the location information is received. The location information can be received in a public action frame, beacon, and/or other frame. In some embodiments, the location information can be received in a frame, such as a public action frame, that can be sent in response to a request from the WLAN station.

Step 704 can include the WLAN station using the location information to select a neighboring access point to use to determine a location of the WLAN station. In this regard, the WLAN station can select a subset of the neighboring access points represented in the received location information for use in location determination. Thus, for example, the location information can be used to select one or more of access points 506 and 508 for use in calculating distance estimates that can be used for location determination. Step 704 can include the WLAN station calculating a distance(s) between the selected neighboring access point(s) and the WLAN station. The calculated distance(s) can, in turn, be used for determination of an absolute and/or relative location of the WLAN station.

Figure 8:
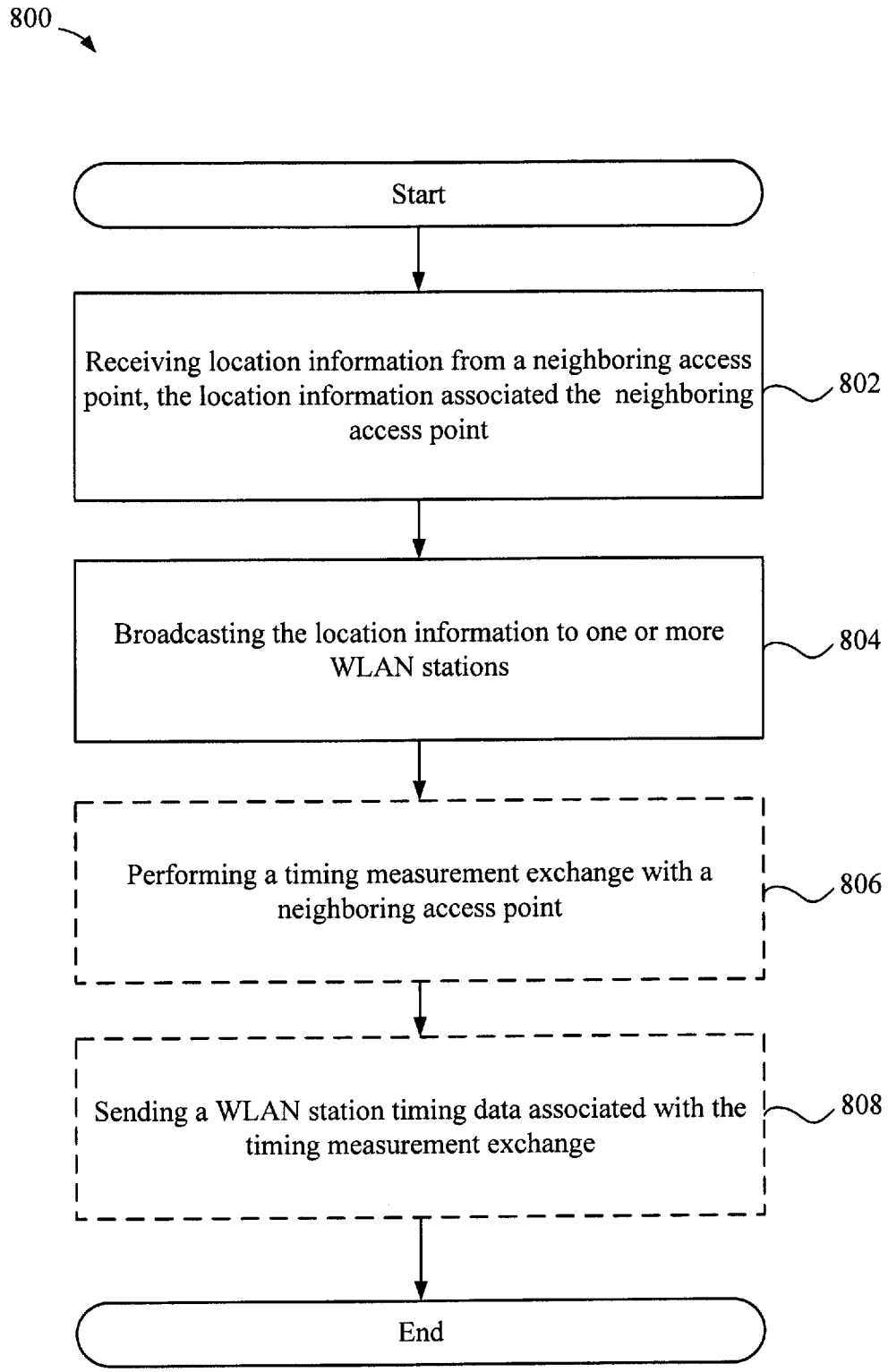
FIG. 8 illustrates a flow chart of a method for sharing location information in accordance with some embodiments.

FIG. 8 illustrates a flow chart 800 of a method for sharing location information in accordance with some embodiments. In this regard, FIG. 8 illustrates operations that can be performed by an access point, such as access point 504, in accordance with various embodiments. One or more of processing circuitry 610, processor 612, memory 614, transceiver 616, or location sharing module 618 can, for example, provide means for performing the operations illustrated in and described with respect to FIG. 8.

Step 802 can include the access point 504 receiving location information from a neighboring access point, such as the access point 506 and/or the access point 508. The location information can be associated with the neighboring access point that sent the location information. The location information can be included in a public beacon or a beacon for WLAN stations that are associated with the access point 504.

Step 804 can include broadcasting the location information to one or more WLAN stations. The location information can be broadcasted in a public action frame, a beacon, and/or other frame. In some embodiments, a WLAN station listening to the access point 504 is not associated with the access point 504. In some embodiments, the access point 504 broadcasts the location information to WLAN stations not associated with the access point 504, but does not provide unassociated WLAN stations with other services the access point 504 provides. In this regard, the access point 504 can communicate with unassociated WLAN stations for the limited purpose of providing the location information. In some embodiments, the location information can be sent to a WLAN station in response to receiving a request for the location information from the WLAN station.

Step 806 can include the access point 504 performing a timing measurement exchange with a neighboring access point. The timing measurement exchange can be initiated by a WLAN station, the access point 105, or the neighboring access point. In some embodiments, the timing measurement exchange is initiated by the WLAN station for the purpose of calculating a location of the WLAN station. Step 808 can include the access point 504 sending timing data to the WLAN station. The timing data can be associated with the timing exchange measurement performed with the neighboring access point in step 806. In some embodiments, timing data is sent to the WLAN station while a timing measurement exchange with a neighboring access point is occurring. In other embodiments, the access point 504 can send the WLAN station timing data after a timing measurement exchange is complete. The WLAN station can use the timing data to calculate a location of the WLAN station. In some embodiments, step 806 and step 808 can be optional steps.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium is any data storage device that can store data which can thereafter be read by a computer system. Furthermore, the computer readable storage medium can be non-transitory. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for determining a location of a first wireless local area network (WLAN) station configured to communicate over a first channel with a second WLAN station, the method comprising:
   by the first WLAN station:
      receiving a first packet sent by the second WLAN station;
      deriving a first channel quality metric for the first channel based on the received first packet, the first channel quality metric comprising a ratio of energy of a shortest path between the first WLAN station and the second WLAN station to a sum of energies of a plurality of paths between the first WLAN station and the second WLAN station;
      comparing the first channel quality metric to a threshold; and
      calculating a first distance between the first WLAN station and the second WLAN station when the first channel quality metric satisfies the threshold, wherein the second WLAN station comprises an access point and the first WLAN station is not associated with the second WLAN station when receiving the first packet from the second WLAN station,
   wherein deriving the first channel quality metric comprises using the first packet to estimate the first channel by calculating a first channel impulse response, and
   wherein, when the first channel impulse response is represented in a time domain, the energy of the shortest path comprises a squared magnitude of a first tap of the first channel impulse response and the sum of energies of the plurality of paths comprises a sum of squared magnitudes of a plurality of taps of the first channel impulse response.

2. The method of claim 1, wherein, when the first channel impulse response is represented in a frequency domain, the energy of the shortest path comprises a squared sum of magnitudes of the plurality of taps of the first channel impulse response and the sum of energies of the plurality of paths comprises a sum of squared magnitudes of the plurality of taps of the first channel impulse response.

3. The method of claim 1, wherein the first packet comprises timing data sent by the access point as part of a timing measurement exchange between the access point and a second access point.

4. The method of claim 1, further comprising, by the first WLAN station:
   deriving a second channel quality metric based on a second packet received from a third WLAN station, the second channel quality metric being indicative of a quality of a second channel between the first WLAN station and the third WLAN station, the second channel quality metric comprising a ratio of energy of a shortest path between the first WLAN station and the third WLAN station to a sum of energies of a plurality of paths between the first WLAN station and the third WLAN station;
   calculating a second distance between the first WLAN station and the third WLAN station;
   calculating a first weighted distance by applying a first weight to the first distance based on the first channel quality metric;
   calculating a second weighted distance by applying a second weight to the second distance based on the second channel quality metric; and
   estimating the location of the first WLAN station based on the first weighted distance and the second weighted distance,
   wherein values of the first and second weights are based at least in part on a comparison of the first and second channel quality metrics to the threshold.

5. The method of claim 1, wherein the first packet includes a public action frame.

6. The method of claim 1, wherein the first packet includes a beacon.

7. The method of claim 6, further comprising at the first WLAN station:
   prior to receiving the first packet from the second WLAN station:
      receiving beacon timing information associated with the second WLAN station from a third WLAN station; and
      listening for beacons broadcast by the second WLAN station at a time interval or at a frequency identified in the received beacon timing information.

8. A wireless local area network (WLAN) station, comprising:
   a wireless interface;
   a processor;
   a storage apparatus configured to store instructions that, when executed by the processor, cause the WLAN station to:
      receive a first packet sent by a second WLAN station over a first channel;
      derive a first channel quality metric for the first channel based on the received first packet, the first channel quality metric comprising a ratio of energy of a shortest path between the WLAN station and the second WLAN station to a sum of energies of a plurality of paths between the WLAN station and the second WLAN station;
      compare the first channel quality metric to a threshold; and
      calculate a first distance between the WLAN station and the second WLAN station when the first channel quality metric satisfies the threshold, wherein the second WLAN station comprises an access point and the WLAN station is not associated with the second WLAN station when receiving the first packet from the second WLAN station, wherein deriving the first channel quality metric comprises using the first packet to estimate the first channel by calculating a first channel impulse response, and wherein, when the first channel impulse response is represented in a time domain, the energy of the shortest path comprises a squared magnitude of a first tap of the first channel impulse response and the sum of energies of the plurality of paths comprises a sum of squared magnitudes of a plurality of taps of the first channel impulse response.

9. The WLAN station of claim 8, wherein, when the first channel impulse response is represented in a frequency domain, the energy of the shortest path comprises a squared sum of magnitudes of the plurality of taps of the first channel impulse response and the sum of energies of the plurality of paths comprises a sum of squared magnitudes of the plurality of taps of the first channel impulse response.

10. The WLAN station of claim 8, wherein the first packet comprises timing data sent by the access point as part of a timing measurement exchange between the access point and a second access point.

11. The WLAN station of claim 8, wherein additional instructions included in the storage apparatus, when executed by the processor, cause the WLAN station to:

derive a second channel quality metric based on a second packet received from a third WLAN station, the second channel quality metric being indicative of a quality of a second channel between the WLAN station and the third WLAN station, the second channel quality metric comprising a ratio of energy of a shortest path between the WLAN station and the third WLAN station to a sum of energies of a plurality of paths between the WLAN station and the third WLAN station;

calculate a second distance between the WLAN station and the third WLAN station;

calculate a first weighted distance by applying a first weight to the first distance based on the first channel quality metric;

calculate a second weighted distance by applying a second weight to the second distance based on the second channel quality metric; and estimate the location of the WLAN station based on the first weighted distance and the second weighted distance, wherein values of the first and second weights are based at least in part on a comparison of the first and second channel quality metrics to the threshold.

12. The WLAN station of claim 8, wherein the first packet includes a public action frame.

13. The WLAN station of claim 8, wherein the first packet includes a beacon.

14. The WLAN station of claim 13, further comprising at the WLAN station:

prior to receiving the first packet from the second WLAN station:

receiving beacon timing information associated with the second WLAN station from a third WLAN station; and listening for beacons broadcast by the second WLAN station at a time interval or at a frequency identified in the received beacon timing information.

15. A non-transitory computer readable storage medium configured to store instructions that, when executed by a processor included in a wireless local area network (WLAN) station, cause the WLAN station to:

receive a first packet sent by a second WLAN station over a first channel, the first channel quality metric comprising a ratio of energy of a shortest path between the WLAN station and the second WLAN station to a sum of energies of a plurality of paths between the WLAN station and the second WLAN station;

derive a first channel quality metric for the first channel based on the received first packet;

compare the first channel quality metric to a threshold; and calculate a first distance between the WLAN station and the second WLAN station when the first channel quality metric satisfies the threshold, wherein the second WLAN station comprises an access point and the WLAN station is not associated with the second WLAN station when receiving the first packet from the second WLAN station, wherein deriving the first channel quality metric comprises using the first packet to estimate the first channel by calculating a first channel impulse response, and wherein, when the first channel impulse response is represented in a time domain, the energy of the shortest path comprises a squared magnitude of a first tap of the first channel impulse response and the sum of energies of the plurality of paths comprises a sum of squared magnitudes of a plurality of taps of the first channel impulse response.

16. The non-transitory computer readable storage medium of claim 15, wherein, when the first channel impulse response is represented in a frequency domain, the energy of the shortest path comprises a squared sum of magnitudes of the plurality of taps of the first channel impulse response and the sum of energies of the plurality of paths comprises a sum of squared magnitudes of the plurality of taps of the first channel impulse response.

17. The non-transitory computer readable storage medium of claim 15, wherein the first packet comprises timing data sent by the access point as part of a timing measurement exchange between the access point and a second access point.

18. The non-transitory computer readable storage medium of claim 15, further configured to store instructions that, when executed by the processor included in the WLAN station, cause the WLAN station to perform the following:

derive a second channel quality metric based on a second packet received from a third WLAN station, the second channel quality metric being indicative of a quality of a second channel between the WLAN station and the third WLAN station, the second channel quality metric comprising a ratio of energy of a shortest path between the WLAN station and the third WLAN station to a sum of energies of a plurality of paths between the WLAN station and the third WLAN station;

calculate a second distance between the WLAN station and the third WLAN station;

calculate a first weighted distance by applying a first weight to the first distance based on the first channel quality metric;

calculate a second weighted distance by applying a second weight to the second distance based on the second channel quality metric; and estimate the location of the WLAN station based on the first weighted distance and the second weighted distance, wherein values of the first and second weights are based at least in part on a comparison of the first and second channel quality metrics to the threshold.

\* \* \* \* \*